US012699945B2

(12) United States Patent
Gul et al.

(10) Patent No.: US 12,699,945 B2
(45) Date of Patent: Aug. 4, 2026

(54) METHODS, SYSTEMS, ARTICLES OF MANUFACTURE, AND APPARATUS TO IMPROVE SPACE MODELING

(71) Applicant: Nielsen Consumer LLC, Chicago, IL (US)

(72) Inventors: Evren Gul, Chicago, IL (US); Alvin Lim, Turtletown, TN (US)

(73) Assignee: Nielsen Consumer LLC, Chicago, IL (US)

( * ) Notice: Subject to any disclaimer, the term of this patent is extended or adjusted under 35 U.S.C. 154(b) by 356 days.

(21) Appl. No.: 18/191,544

(22) Filed: Mar. 28, 2023

(65) Prior Publication Data

US 2024/0330836 A1     Oct. 3, 2024

(51) Int. Cl.
*G06Q 10/067*          (2023.01)
*G06Q 10/0875*        (2023.01)

(52) U.S. Cl.
CPC ....... *G06Q 10/067* (2013.01); *G06Q 10/0875* (2013.01)

(58) Field of Classification Search
CPC ..................... G06Q 10/067; G06Q 10/0875
See application file for complete search history.

(56) References Cited

U.S. PATENT DOCUMENTS

2014/0067467 A1* 3/2014 Rangarajan ............ G06Q 30/02
705/7.29
2024/0257045 A1* 8/2024 Wang ................... G06Q 10/087

OTHER PUBLICATIONS

Flamand, "Store-Wide Shelf-Space Allocation with Ripple Effects Driving Traffic", Mar. 16, 2023, Operations Research, https://pubsonline.informs.org/doi/abs/10.1287/opre.2023.2437 (Year: 2023).*
Zola, "Planogram", Dec. 2022, https://www.techtarget.com/whatis/definition/planogram (Year: 2022).*
https://en.wikipedia.org/wiki/Logit (Year: 2025).*
Xu et al., "Maximizing Store Revenues using Tabu Search for Floor Space Optimization," arXiv:2011.04422v1, Nov. 4, 2020, 27 pages.

* cited by examiner

*Primary Examiner* — Allen C Chein
(74) *Attorney, Agent, or Firm* — Hanley, Flight & Zimmerman, LLC

(57)          ABSTRACT

Methods, apparatus, systems, and articles of manufacture are disclosed to improve space modeling identify a category-level planogram length and category-level predictors for a category, apply a first model to transform the category-level planogram length and the category-level predictors for the category to a first-model-compatible category-level planogram length and first-model-compatible category-level predictors, generate a first sales impact value corresponding to the identified category-level planogram length for the category by using the first-model-compatible category-level planogram length and the first-model-compatible category-level predictors, generate a modified category-level planogram corresponding to a second sales impact value for the category, the modified category-level planogram generated by applying a second model to (a) the first sales impact value, (b) at least one constraint, and (c) a candidate category-level planogram of interest, and cause a spatial modification of products corresponding to the category based on the modified category-level planogram.

18 Claims, 7 Drawing Sheets

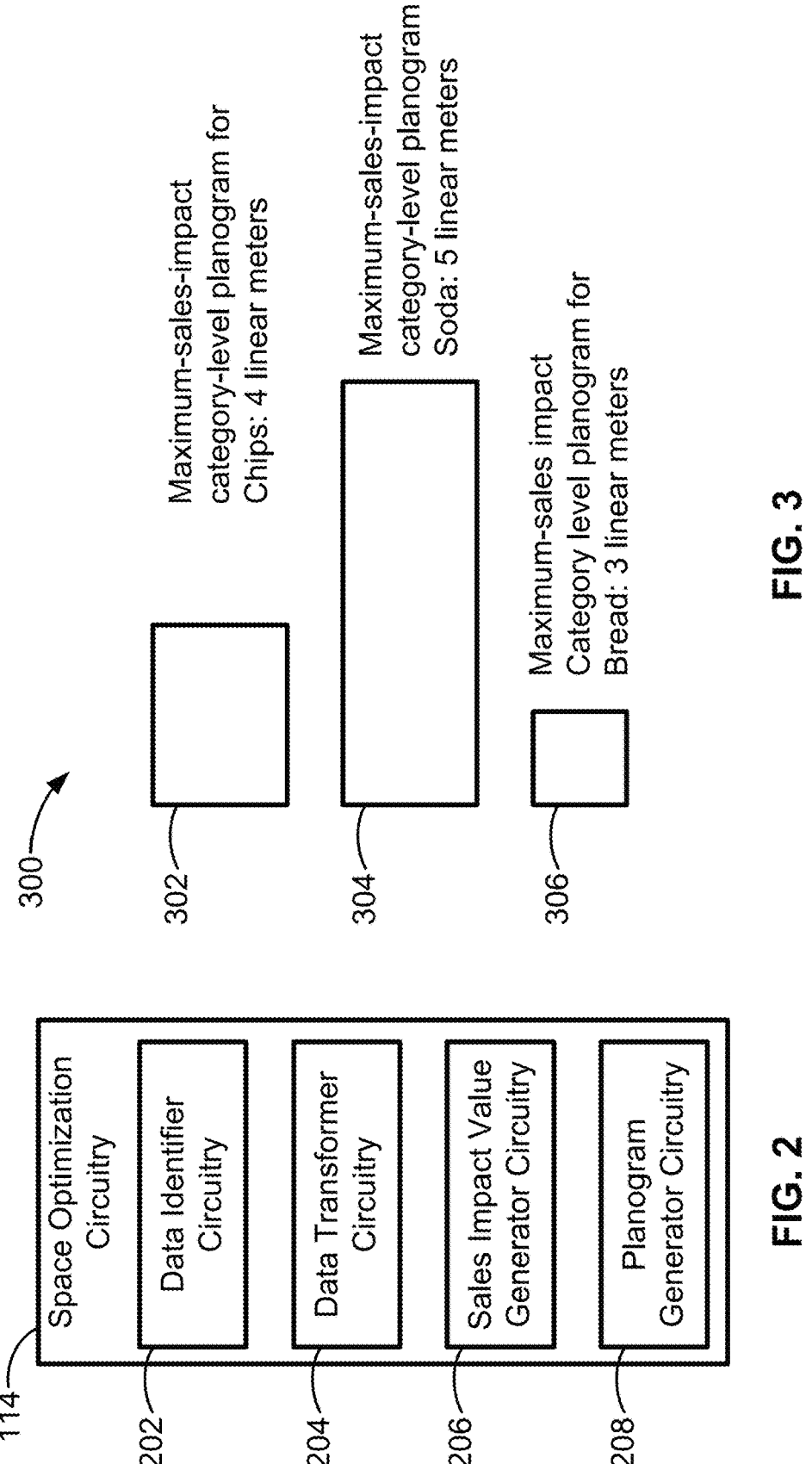

Maximum-sales-impact category-level planogram for Chips: 4 linear meters

Maximum-sales-impact category-level planogram for Soda: 5 linear meters

Maximum-sales impact Category level planogram for Bread: 3 linear meters

Space Optimization Circuitry

202 — Data Identifier Circuitry

204 — Data Transformer Circuitry

206 — Sales Impact Value Generator Circuitry

208 — Planogram Generator Circuitry

FIG. 2

METHODS, SYSTEMS, ARTICLES OF MANUFACTURE, AND APPARATUS TO IMPROVE SPACE MODELING

FIELD OF THE DISCLOSURE

This disclosure relates generally to the technical field of marketing analysis and, more particularly, to methods, systems, articles of manufacture, and apparatus to improve space modeling.

BACKGROUND

In recent years, market participants (e.g., retailers, manufacturers, service providers, etc.) manage many thousands of products in an effort to determine their performance based on planograms, in which planograms represent a spatial layout for products on display with retailers. Because identifying how to organize products in a store requires financial and/or computational effort investments, the market participants have an interest to improving the techniques associated with space modeling research.

BRIEF DESCRIPTION OF THE DRAWINGS

FIG. 2 is a block diagram of example space optimization circuitry to facilitate the example environment of FIG. 1 in accordance with teachings of this disclosure.

FIG. 3 is an illustration of example planograms to facilitate the example environment of FIG. 1.

Figure 1:
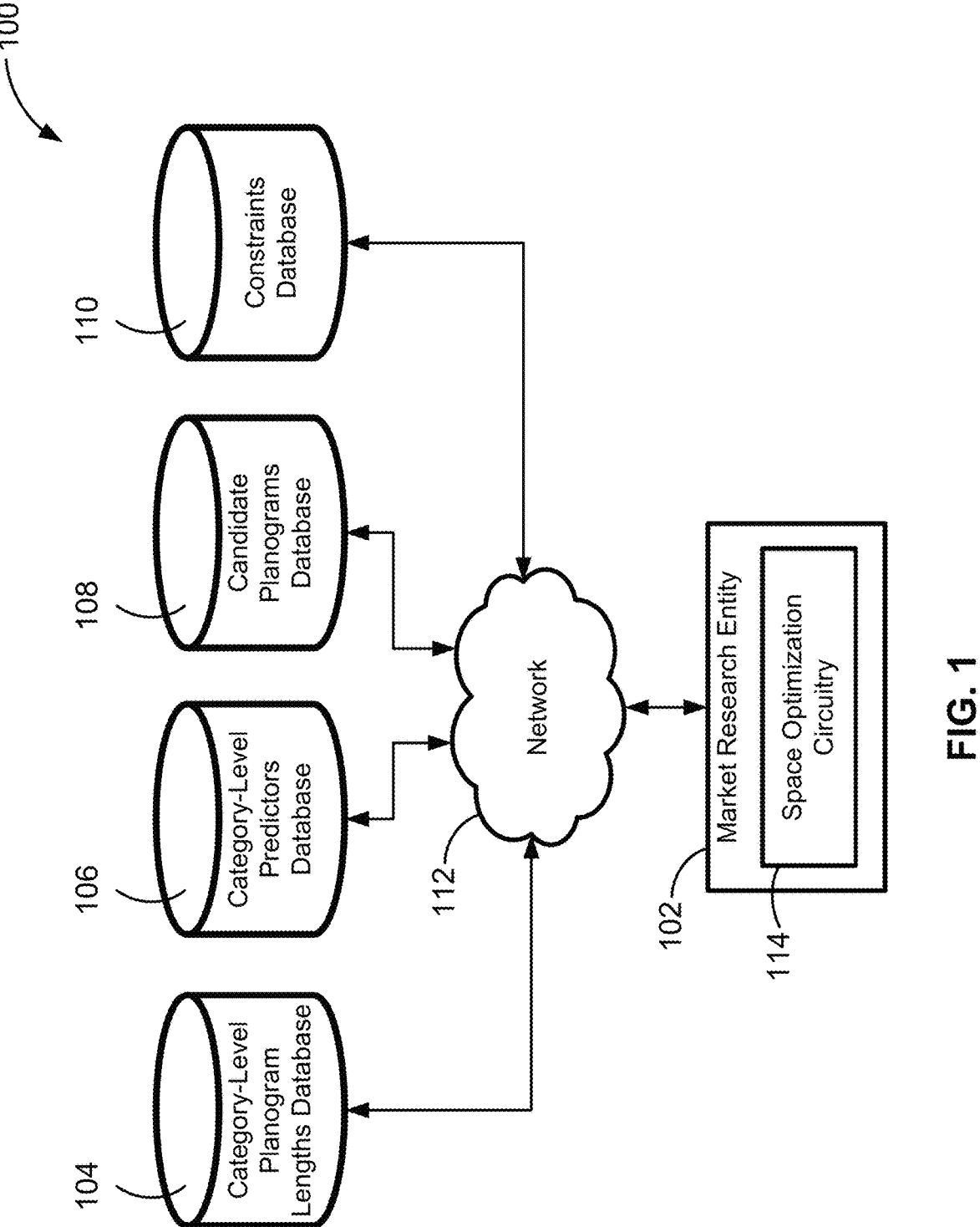
FIG. 1 is a schematic illustration of an example environment to improve space modeling constructed in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

To improve space modeling, market participants (e.g., a manufacturer of a product, a retailer, etc.) typically rely on item-level product data (e.g., data related to bags of chips, soda cans, etc.) as distinguished from category-level product data (e.g., data related to chips as a whole grouping, soda as a whole grouping, etc.). Item-level data is granular (e.g., representing a dimensional length of a single product, dimensional width of a single product, etc.), whereas category-level product data is relatively broad (e.g., representing a dimensional length of products—plural). For instance, a typical grocery store in North America carries about 50,000 products. If a retailer would like to increase 100% of the presence of an item (e.g., 1 bag of chips to 2 bags of chips), it would be impractical to measure the sales impact that increase has. On the other hand, if a retailer would like to increase the presence of a category by 10% (e.g., 5 meters of chips to 5.5 meters of chips), a more reliable and measurable result would be enabled by examples disclosed herein regarding the sales impact and sales-maximizing planograms for that category. From a market participant's perspective, item-level product data is not easily measurable or reliable to determine where to place products in a store to improve (e.g., increase) sales. Several factors such as price, weather, holidays, etc. may contribute to the improved utilization of space for products to generate improved (e.g., increased) sales revenue.

The computational resources involved to apply traditional techniques to improve space modeling is not only complicated and computationally expensive to implement and automate, but applying such traditional techniques also lead to inaccurate space optimization determinations. Such inaccurate determinations lead to erroneous market effects (e.g., causing a product to be placed and/or otherwise assigned in an area in the store that results in relatively lower sales than could otherwise be achieved, etc.).

Unlike traditional approaches of improving space modeling, which represent ad hoc and/or computationally expensive processes, examples disclosed herein structure the space modeling improvement process to, in part, use only two models. In particular, examples disclosed herein include a first model as a space efficiency model and a second model as a space optimization model. In other words, examples disclosed herein first generate a sales impact value corresponding to each category-level planogram length for each category based on (a) category-level planogram lengths and (b) different category-level predictors (e.g., price, holiday impact, weather impact, etc.). Secondly, examples disclosed herein generate a planogram (e.g., a sales-improving planogram) for each category using the sales impact values from the first model, constraints (e.g., a number of shelves a store has, how much freezer space a store has, how much a store can grow or shrink in terms of space, etc.), and candidate category-level planograms. Thus, examples disclosed herein eliminate market participants' reliance on item-level product data to decide, for instance, where to place a product, which products to remove from shelves, and/or which products to place on shelves to improve (e.g., maximize) the sales impact. Additionally, examples disclosed herein improve the technological field of market analysis that is ordinarily burdened with inefficient use of computational resources. In some examples, general computational resources that employ traditional techniques to improve space modeling consume wasted computational cycles during troubleshooting and/or re-calculation efforts. However, examples disclosed herein specifically tailor and/or otherwise structure general computational resources to exhibit specialized capabilities that reduce otherwise computationally expensive processes to troubleshoot which prior product placement and/or promotional decisions were unsuccessful. For instance, in the event a retailer (e.g., a manager chartered with the responsibility to stock particular products in particular areas in the store, promote particular products by product placement in the store, determine how to display particular products on shelves, etc.) makes product placement decisions at a first time, aggregate sales metrics may exhibit undesirable drops. Because the retailer likely made many such decisions of which products to stock in particular locations, and/or made decisions regarding how to promote the products, subsequent computational efforts to calculate which ones of those decisions was the cause of poor market observations increases.

Furthermore, there are thousands of products at a single retail store and the human mind is incapable to process, in a reasonable amount of time, the sales impact of a product based on item-level product data. Accordingly, examples disclosed herein reduce a need for computational efforts to identify sales-maximizing planograms and sales impact values for categories of products that were subjected to mere discretionary choices (e.g., placed in a store and/or otherwise promoted based on a discretionary choice by the retailer or based on item-level product data).

FIG. 1 is a schematic illustration of an example environment 100 to improve space modeling constructed in accordance with teachings of this disclosure. In the illustrated example of FIG. 1, the environment 100 includes an example market research entity (MRE) 102 communicatively connected to an example network 112. For instance, the example MRE 102 of FIG. 1 is communicatively connected to an example network 112 that is further communicatively connected to an example category-level planogram lengths database 104, an example category-level predictors database 106, an example candidate planograms database 108, and an example constraints database 110. While the illustrated example of FIG. 1 includes the aforementioned databases (e.g., data sources), examples disclosed herein are not limited thereto. In some examples, the aforementioned databases and/or data from such databases may be aggregated into a single or multiple databases which are either communicatively connected to the MRE 102 via the example network 112, and/or directly communicatively connected to the MRE 102. As described in further detail below, the MRE 102 includes example space optimization circuitry 114 to improve space modeling as explained with a use case scenario of improving space modeling for marketing analysis. While examples disclosed herein consider a use case scenario of improve space modeling for marketing analysis, such examples disclosed herein are not limited to that use case scenario.

FIG. 2 illustrates additional detail corresponding to the example space optimization circuitry 114 of FIG. 1. In the illustrated example of FIG. 2, the example space optimization circuitry 114 includes example data identifier circuitry 202, example data transformer circuitry 204, example sales impact value generator circuitry 206, and example planogram generator circuitry 208.

In operation, and as described in further detail below, the example data identifier circuitry 202 identifies input data such as category-level planogram lengths, category-level predictors, candidate category-level planograms, and constraints. The example data transformer circuitry 204 transforms input category-level data such as a category-level planogram lengths and category-level predictors for each category. The example sales impact value generator circuitry 206 generates a first sales impact value for each identified category-level planogram length by aggregating the transformed category-level data. The example planogram generator circuitry 208 generates a sales-maximizing category-level planogram for each category, using the first sales impact values, identified constraints, and identified candidate category-level planograms.

As described above, the illustrated example of FIG. 2 is a block diagram of the example space optimization circuitry 114 to improve space modeling. The example space optimization circuitry 114 of FIGS. 1 and 2 may be instantiated (e.g., creating an instance of, bring into being for any length of time, materialize, implement, etc.) by processor circuitry such as a central processing unit executing instructions. Additionally or alternatively, the space optimization circuitry 114 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIGS. 1 and 2 may be implemented by microprocessor circuitry executing instructions to implement one or more virtual machines and/or containers.

Figure 4:
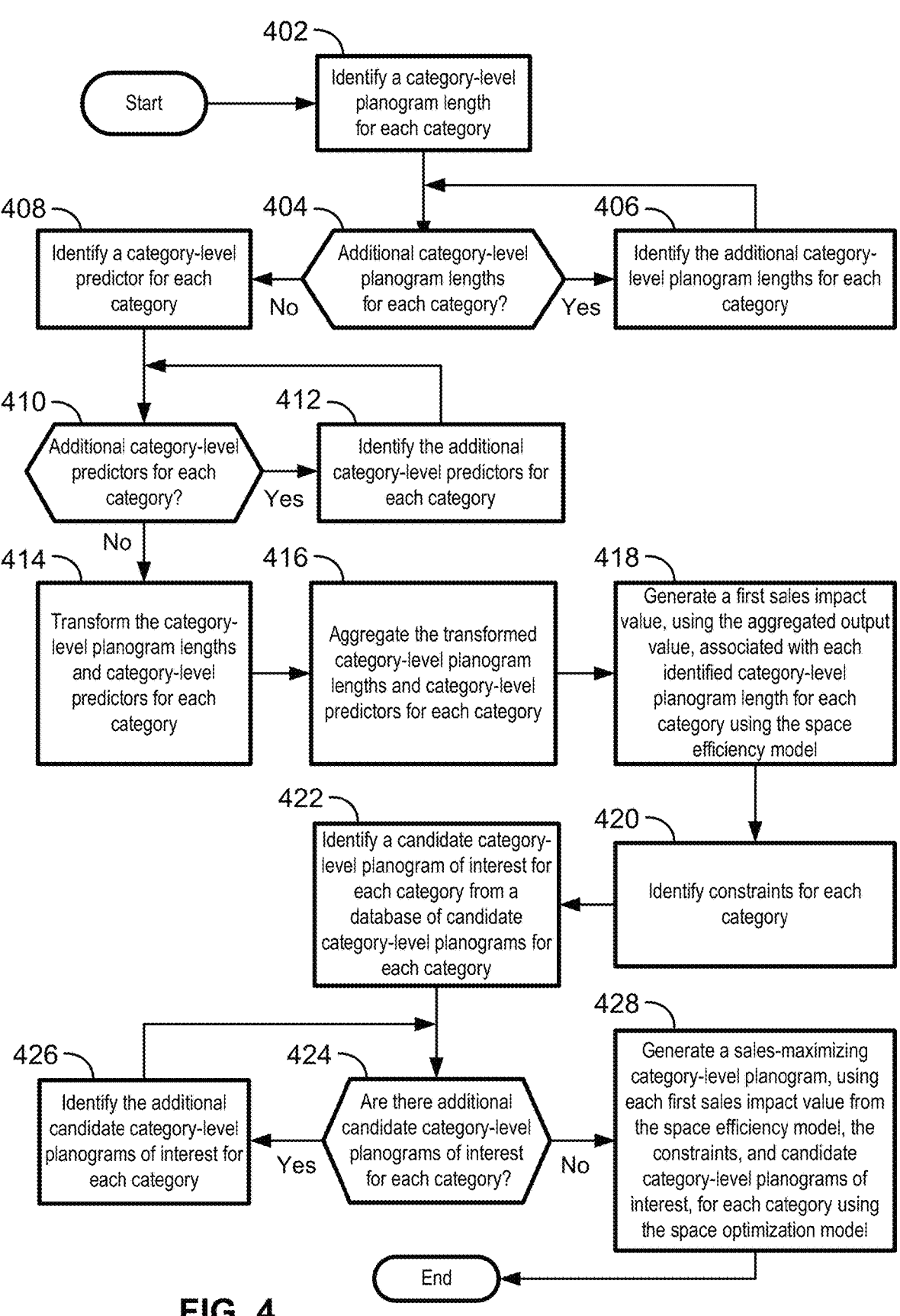
FIG. 4 is a flowchart representative of example machine readable instructions and/or example operations that may be executed by example processor circuitry to implement the example space optimization circuitry of FIGS. 1 and 2.

In some examples, the example data identifier circuitry 202 is instantiated by processor circuitry executing data identifier instructions and/or configured to perform operations such as those represented by the flowchart of FIG. 4. In some examples, the example data transformer circuitry 204 is instantiated by processor circuitry executing data transformer instructions and/or configured to perform operations such as those represented by the flowchart of FIG. 4. In some examples, the example sales impact value generator circuitry 206 is instantiated by processor circuitry executing sales impact value generator instructions and/or configured to perform operations such as those represented by the flowchart of FIG. 4. In some examples, the example planogram generator circuitry 208 is instantiated by processor circuitry executing planogram generator instructions and/or configured to perform operations such as those represented by the flowchart of FIG. 4.

Returning to the illustrated example of FIG. 2, in operation the example data identifier circuitry 202 identifies data from user input or a database such as, but not limited to, the example category-level planogram lengths database 104 and the example category-level predictors database 106. In some examples, there may be other sources from which data is identified by the example data identifier circuitry 202. More specifically, the example data identifier circuitry 202 first identifies a category-level planogram length for each category from the example category-level planogram lengths database 104. The category-level planogram length represents a linear dimension of a planogram in a store corresponding to a category (e.g., chips, bread, soda, etc.). The category-level planogram length identified first may be also known as the main planogram length for a category.

The example data identifier circuitry 202 identifies the main planogram length (MPL) for each category. In some examples, the example data identifier circuitry 202 identifies the main planogram length for each category in a manner consistent with example Equation 1.

$$MPL_{csw} = \frac{\sum_{i \in I_{cp}} f_{ip} \times w_i}{\sum_{j \in I_p} f_{jp} \times w_j} \times l_P. \qquad \text{Equation 1}$$

In the illustrated example of Equation 1, $f_{ip}$ represents a number of facings that an item, i, has in the planogram, $w_i$ represents the width of an item, i, and $l_p$ represents the length of the main planogram of a category, c, in a store, s. While $MPL_{csw}$ represents the main planogram length of a category, in some examples, the $MPL_{csw}$ will equal $l_p$ for a category.

Furthermore, additional category-level planogram lengths may be identified by the example data identifier circuitry 202. The additional category-level planogram lengths may be also known as the other planogram lengths or, in some examples, satellite planogram lengths. For example, the main planogram length for the category of chips may be 3 meters. However, chips may have other locations in a store in which they can be placed. In this example, additional category-level planogram lengths or satellite planogram lengths for chips may be 2 meters and 1 meter, while the main planogram length would be 3 meters. The category-level planogram length and additional category-level planogram lengths are identified by the example data identifier circuitry 202 to determine what overall category-level planogram lengths are available for a certain category in a store.

The example data identifier circuitry 202 identifies the satellite planogram lengths for each category. In some examples, the example data identifier circuitry 202 identifies the satellite planogram lengths (sometimes represented as OPL for "other planogram lengths" or "SPL" for "satellite planogram lengths") for each category in a manner consistent with example Equation 2.

$$OPL_{csw} = \sum_{p \in P_o} \left( \frac{\sum_{i \in I_{cp}} f_i \times w_i}{\sum_{j \in I_p} f_j \times w_j} \times l_P \right). \qquad \text{Equation 2}$$

In the illustrated example of Equation 2, $f_i$ represents a number of facings that item, i, has in the planogram, $w_i$ represents the width of item, i, and $l_p$ represents the length of a planogram, p, other than the main planogram, corresponding to a category, c, in a store, s. $OPL_{csw}$ is the value of the satellite planogram lengths for a category, or, in other words, the sum of the planogram lengths of a category other than the main planogram length.

Each category has category-level predictors which represent how a category may be affected or what transactional aspects represent a category. The example data identifier circuitry 202 identifies a category-level predictor for each category from user input or the example category-level predictors database 106. A category-level predictor is a transactional parameter that represents a category. Examples of category-level predictors include, but are not limited to, store productivity (e.g., volume per store selling meter), category price index, category promotion percentage (e.g., volume exposed to promotion), category out-of-stock percentage (e.g., volume exposed to out-of-stock), holiday variables (e.g., whether certain holidays have occurred in an observed week), weather variables (e.g., how weather affects volume), linear trend (e.g., over the next year), and complementary category variables (e.g., a variable closely-related to or commonly associated with a category based on previous year data). These example category-level predictors will be explained in further detail below. A category-level predictor represents a category and how a category may be affected transactionally or in terms of sales. In some examples, there may be more than one predictor identified as having a degree of influence on a category's sales' performance.

The example data identifier circuitry 202 identifies the store productivity for each category. In some examples, the example data identifier circuitry 202 identifies the store productivity for each category in a manner consistent with example Equation 3.

$$store\_prod_{sw} = \frac{\sum_{w=i+1}^{i+T} SEQV_{sw}}{\sum_{w=i+1}^{i+T} SSM_{sw}}. \qquad \text{Equation 3}$$

In the illustrated example of Equation 3, $SQEV_{sw}$ represents a store equivalized volume. In the illustrated example of Equation 3, $SSM_{sw}$ represents a store's selling meters for a store, s, and in week, w, wherein the planogram change that occurred in week, i, and remained for weeks, T, until the next planogram change. In the illustrated example of Equation 3, $store\_prod_{sw}$ is measured as the equalized volume per store selling meter. In some examples, seasonality may affect the store productivity. In some examples, the store productivity for the next 52 weeks will be the same as it was in the last 52 weeks.

The example data identifier circuitry 202 identifies the category price index for each category. In some examples, the example data identifier circuitry 202 identifies the category price index for each category in a manner consistent with example Equation 4.

$$PI_{cW} = \frac{\sum_{i \in I_c} P_{iW} \times V_{iW}}{\sum_{i \in I_c} V_{iW}}. \qquad \text{Equation 4}$$

In the illustrated example of Equation 4, $V_{iW}$ represents a total volume of an item, i, in a four-week window, w, $P_{iW}$ represents an out-the-door price of an item (e.g., price a customer pays after any promotions, sales, coupons, etc.), i, in a four-week window, w, and $PI_{cW}$ represents a price index of a category, c, for the four-week window, w. $PI_{cW}$ is measured as the price at for a category. While the example window, w, is considered as a four-week period of time, other examples can be of any number of weeks. However, in some examples a four-week window avoids overfitting and adds to the space efficiency model's predictive capability. In some examples, the most recent category price index will be valid for the next 52 weeks.

The example data identifier circuitry 202 identifies the category promotion percentage for each category. In some examples, the example data identifier circuitry 202 identifies the category promotion percentage for each category in a manner consistent with example Equation 5.

$$spe\_pro_{csw} = \frac{\sum_{i \in I_c} EQV_{cswi} \times I_{cswi}}{\sum_{i \in I_c} EQV_{cswi}}. \qquad \text{Equation 5}$$

In the illustrated example of Equation 5, $EQV_{cswi}$ represents an equalized volume for a category, c, sold in a store, s, in the ith week and $I_{cswi}$ represents a set of items in a category, c, wherein $I_{cswi}$ is 1 if the item, i, is on promotion in week, w, and in store, s, or otherwise it is 0. $spe\_pro_{csw}$ represents the equalized volume exposed to promotion. In some examples, the equalized volume exposed to promotion values are the same as previous 52 weeks' values.

The example data identifier circuitry 202 identifies the category out-of-stock (OOS) percentage for each category. In some examples, the example data identifier circuitry 202 identifies the category OOS percentage for each category in a manner consistent with example Equation 6.

$$spe\_oos_{csw} = \frac{\sum_{i \in I_c} EQV_{cswi} \times O_{cswi}}{\sum_{i \in I_c} EQV_{cswi}}. \qquad \text{Equation 6}$$

In the illustrated example of Equation 6, $EQV_{cswi}$ represents an equalized volume for a category, c, sold in a store, s, in the ith week and $O_{cswi}$ represents a set of items in a category, c, wherein $I_{cswi}$ is 1 if the item, i, went OOS in week, w, and in store, s, or otherwise it is 0. $spe\_oos_{csw}$ represents the equalized volume exposed to OOS.

The example data identifier circuitry 202 identifies the holiday indicator variables for each category. In some examples, the example data identifier circuitry 202 identifies the holiday indicator variables for each category in a manner consistent with example Rule 1.

$$H_{cswi} = \begin{cases} 1 & \text{if } ith \text{ falls in week, } w, \text{ for category, } c, \text{ and store, } s, \quad \text{Rule 1} \\ 0 & \text{otherwise} \end{cases}.$$

In the illustrated example of Rule 1, $H_{cswi}$ represents a standardized ith holiday variable indicating whether certain holidays have occurred in an observed week, w, for a category, c, in store, s. In some examples, there are individual holiday variables for each holiday considered by a market participant. Holiday variable values may change with respect to geographic locations. For instance, school holidays might be different weeks for different geographic regions. For major holidays, such as Christmas and Easter, pre-holiday and post-holiday variables for the week before and after a major holiday, respectively, may be used in a manner consistent to Rule 1.

The example data identifier circuitry 202 identifies the weather variables for each category. The weather variables help to explain changes in equivalized volume. Examples of weather variables include, but are not limited to, precipitation and temperature. Precipitation and temperature are both generated using average values. $W_{cswi}$ represents the jth weather variable for a store, s, in week, w. In some examples, the weather for the next year will be same as the weather in the last year.

The example data identifier circuitry 202 identifies the complementary category variables for each category. A complementary category variable is a variable closely-related to or commonly associated with the category identified by the example data identifier circuitry 202. For example, if "chips" is the identified category, then two complementary category variables may be related to "dip" and "soda" categories as they are often associated with "chips". In some examples, the example data identifier circuitry 202 identifies the complementary category variables for each category in a manner consistent with example Equation 7.

$$\text{cmpl\_eqvpm}_{cswk} = \frac{EQV_{cswk}}{SSM_{sw}}. \qquad \text{Equation 7}$$

In the illustrated example of Equation 7, $EQV_{cswk}$ represents equalized volume for a category, c, sold in a store, s, for the kth complementary variable. In the illustrated example of Equation 7, $SSM_{sw}$ is a store's selling meters for a store, s, and in week, w. In the illustrated example of Equation 7, $\text{cmpl\_eqvpm}_{cswk}$ represents the complementary categories of a given category found by market basket analysis. In some examples, the complementary variables for the next 52 weeks will be equal to the complementary variables of the last 52 weeks.

The example data identifier circuitry 202 identifies the linear trend variables for each category. In some examples, the example data identifier circuitry 202 identifies the linear trend variables for each category in a manner consistent with example Equation 8.

$$\text{linear\_trend}_{csw} = \frac{\text{week\_num}_{csw} - \text{model\_start\_week\_num}}{52}. \qquad \text{Equation 8}$$

In the illustrated example of Equation 8, $\text{week\_num}_{csw}$ represents a week number for a category, c, sold in a store, s, in week, w, and model_start_week_num represents a week number for the model start week. $\text{linear\_trend}_{csw}$ represents a linear trend for a category. In some examples, seasonality may affect the linear trend. In some examples, the linear trend will continue towards the next 52 weeks.

After the category-level planogram lengths and category-level predictors are identified, the example data transformer circuitry 204 transforms the identified category-level data to standardized values that can be used effectively by the space efficiency model to generate the sales impact, as explained in further detail below. The identified category-level data must be standardized to account for undesired variations of the identified category-level data. For example, if there are variations in units for certain category-level predictors, the values will not be usable by the space efficiency model to effectively determine the first sales impact value, as explained in further detail below.

The example data transformer circuitry 204 transforms the identified category-level data, such as the category-level planogram lengths and category-level predictors, for each category. In some examples, the transformed category-level planogram length and category-level predictors are also known as a first-model-compatible category-level planogram length and first-model-compatible category-level predictors, respectively. In some examples, the example data transformer circuitry 204 transforms the identified category-level data for each category in a manner consistent with example Equations 9-18.

$$\beta_1 \times MPL_{csw}. \qquad \text{Equation 9}$$

$$\beta_2 \times OPL_{csw}. \qquad \text{Equation 10}$$

$$\beta_3 \times pi_{csw}. \qquad \text{Equation 11}$$

$$\beta_4 \times spe_{oos_{csw}}. \qquad \text{Equation 12}$$

$$\beta_5 \times spe_{pro_{csw}}. \qquad \text{Equation 13}$$

$$\beta_6 \times \text{store}_{prod_{sw}}. \qquad \text{Equation 14}$$

$$\sum_i \gamma_i \times H_{cswi}. \qquad \text{Equation 15}$$

$$\sum_j \theta_j \times W_{swj}. \qquad \text{Equation 16}$$

$$\sum_k \eta_k \times \text{cmpl\_eqvpm}_{cswk}. \qquad \text{Equation 17}$$

$$\beta_7 \times \text{linear\_trend}_{csw}. \qquad \text{Equation 18}$$

In the illustrated example of Equations 9-18, $\beta_1$, $\beta_2$, $\beta_3$, $\beta_4$, $\beta_5$, $\beta_6$, and $\beta_7$ represent coefficients (sometimes referred to as "transformers") for the MPL, other planogram lengths, category price index, category OOS percentage, category promotion percentage, store productivity, and linear trend variables, respectively. Generally speaking, coefficients represent an affect of a particular variable. In the illustrated example of Equation 15, $\gamma_i$ represents a coefficient for the holiday indicator variables. In the illustrated example of Equation 16, $\theta_j$ represents a coefficient for the weather variables, and in the illustrated example of Equation 17 $\eta_k$ represents a coefficient for the complementary category variables.

After the identified category-level data is transformed, the example sales impact value generator circuitry 206 generates a first sales impact value for each identified category-level planogram length for each category. A first sales impact value is a value that represents an amount of sales a category is generating for each associated category-level planogram length. In some examples, the example sales impact generator circuitry 206 generates the first sales impact value for each identified category-level planogram length for each category in a manner consistent with example Equation 19.

$$\log\left(\frac{EQV_{csw}}{EQV_{cs}^{max} - EQV_{csw}}\right) = \qquad \text{Equation 19}$$

$$\alpha_{sc} \times 1 + \beta_1 \times MPL_{csw} + \beta_2 \times OPL_{csw} + \beta_3 \times pi_{csw} +$$

$$\beta_4 \times spe_{oos_{csw}} + \beta_5 \times spe_{pro_{csw}} + \beta_6 \times \text{store}_{prod_{sw}} +$$

$$\sum_i \gamma_i \times H_{cswi} + \sum_j \theta_j \times W_{swj} + \cdot \sum_k \eta_k \times \text{cmpl\_eqvpm}_{cswk} +$$

$$\beta_7 \times \text{leaner\_trend}_{csw} + \varepsilon_{csw}.$$

In the illustrated example of Equation 19, $EQV_{csw}$ represents a category equivalized volume for a category, c, in store, s, and in week, w. In the illustrated example of Equation 19, $$EQV_{cs}^{max}$$

represents a theoretical maximum equivalized volume for category, c, and store, s, calculated over a modeling period.

In the illustrated example of Equation 19 $\alpha_{sc}$ represents an intercept at store, s, and category level, and $\varepsilon_{csw}$ represents an error term. These two variables and the variables of Equations 9-18 are aggregated. A logit transformation is performed on the aggregation of the values of Equation 19 to generate the first sales impact value. Equation 19 is also known as the space efficiency model. As explained above, the first sales impact value generated from the space efficiency model will be used by the space optimization model to generate sales-maximizing category-level planograms. For example, if there were three category-level planogram lengths identified for chips (e.g., 3 meters, 4 meters, and 5 meters), the example sales impact value generator circuitry 206 would generate a first sales impact value for each of the category-level planogram lengths such as $5000, $3500, and $4900, respectively.

More specifically, $$EQV_{cs}^{max}$$

is further defined in a manner consistent with example Equation 20 and example Rule 2.

$$EQV_{cs}^{max} = \delta_{cs} + \{1 \times \sigma_{cs}\}. \qquad \text{Equation 20}$$

$$EQV_{cs}^{max} = \begin{cases} 1.05 * \delta_{cs} & \text{if } EQV_{cs}^{max} < 1.05 * \delta_{cs} \\ q & \text{if } 1.05 * \delta_{cs} < EQV_{cs}^{max} < 1.25 * \delta_{cs} \\ 1.25 * \delta_{cs} & \text{if } EQV_{cs}^{max} > 1.25 * \delta_{cs}. \end{cases} \qquad \text{Rule 2}$$

In the illustrated example of Equation 20 and Rule 2, $\delta_{cs}$ represents a maximum equivalized volume for the category, c, in store, s, over a modeling period and $\sigma_{cs}$ represents the standard deviation of equivalized volume for the category, c, in store, s, over a modeling period.

After the first sales impact value is generated, the example data identifier circuitry 202 identifies constraints. Constraints are rules that dictate, for example, the category-level planogram lengths, the fixtures of a store (e.g., freezers, shelves, etc.), and store growth opportunity. For example, consider three constraint levels as a planogram-level, a group-level, and a store-level. In some examples, there may be more than or less than three constraint levels that the example data identifier circuitry 202 may identify. In some examples, no constraints or more than one constraint per constraint level may be identified by the example data identifier circuitry 202. The constraint levels may also be known as business rules.

Returning the three constraint levels, the planogram-level constraint represents limitations given to how much a planogram length may expand or shrink. For example, if a category-level planogram length for chips is 4 meters and the category-level planogram length can only decrease by 1 meter in the store, then a planogram-level constraint for the chips is 4 meters to 3 meters. A group-level constraint represents the maximum length a fixture (e.g., freezers, shelves, etc.) in a store can be. For example, a store that only has 20 meters of freezer space represents a group-level constraint. A store-level constraint represents how much a store can expand or shrink. For example, a store-level constraint for a store could be if the store can only increase by 1% in space. As explained above, there can be any number of constraints specific to a store and varying levels of constraints.

After the constraints are identified by the example data identifier circuitry 202, candidate category-level planograms of interest are identified from a database of candidate category-level planograms for each category. A candidate category-level planogram of interest is a predefined category-level planogram that can be selected from a database. Picking a candidate category-level planogram of interest or multiple candidate category-level planograms of interest per category is helpful in determining which one produces most sales impact for a category, which will be explained in further detail below. In some examples, there may be thousands of candidate category-level planograms of different sizes. For example, the human mind is uncapable to process, in a reasonable amount of time, the sales impact of each candidate category-level planogram. Traditionally, a market participant would use discretion to pick a candidate category-level planogram that would produce high impact sales, which may or may not actually succeed. In some examples, the candidate category-level planogram of interest may also be known as the first candidate category-level planogram. In some examples, more than one candidate category-level planogram of interest for a category may be identified by the example data identifier circuitry 202.

After the candidate category-level planograms of interest are identified, the example planogram generator circuitry 208 generates a sales-maximizing category-level planogram for each category using the space optimization model, as explained in further detail below. The sales-maximizing category-level planograms are generated by taking into account the identified constraints, identified candidate category-level planograms of interest, and first sales impact values from the space efficiency model for each category. In some examples, the sales-maximizing category-level planogram may be known as the second candidate category-level planogram. In some examples, the planogram generator circuitry 208 generates the sales-maximizing category-level planogram for each category in a manner consistent with example Equation 21.

$$\max_{X_{ijk}} \sum_k \sum_{i \in I} \sum_{j \in I_j} R_{ijk} \times X_{ijk} \qquad \text{Equation 21}$$

Subject to $$\sum_{k \in K} \sum_{j \in I^j} X_{ijk} = 1 \ \forall \ i,$$

$$\sum_{i \in I} \sum_{j \in J\_i} l_{ijk} \times X_{ijk} \geq L_k \times lp_k + lc_k \ \forall \ k,$$

$$\sum_{i \in I} \sum_{j \in J\_i} l_{ijk} \times X_{ijk} \leq L_k \times up_k + uc_k \ \forall \ k,$$

$$\sum_k \sum_{i \in I} \sum_{j \in I_j} l_{ijk} \times X_{ijk} \geq TSK \times lp_s + lc_s,$$

$$\sum_k \sum_{i \in I} \sum_{j \in I_j} l_{ijk} \times X_{ijk} \leq TSK \times up_s + uc_s.$$

In the illustrated example of Equation 21, $X_{ijk}$ represents a value of 1 if a jth planogram is selected for category, i, at aisle, k, otherwise the value is 0. $R_{ijk}$ represents a planogram revenue of category, i, and planogram, j, at aisle, k, or in order words, the first sales impact value. $l_{ijk}$ represents a length of planogram, i, of a planogram set, j, at aisle, k. $L_k$ represents a length of aisle, k. TSL represents a total store length. A market participant can set allowed aisle length shrinkages by setting $lp_k$ and $lc_k$ to desired numbers, and allowed aisle length expansions by setting $up_k$ and $uc_k$ to desired numbers. A market participant can set allowed total store length shrinkages by setting $lp_s$ and $lc_s$ to desired numbers, and allowed total store length expansions by setting $up_s$ and $uc_s$ to desired numbers. The output of Equation 21 is the sales-maximizing category-level planogram for each category or in some examples, a modified category-level planogram. For example in one scenario, two candidate category-level planograms of interest for chips are identified by the example data identifier circuitry 202: 4 meters and 5 meters. One planogram-level constraint identified by the example data identifier circuitry 202 is that the category-level planogram length for chips can only expand from 4 meters to 5 meters. Furthermore, the first sales impact values for chips generated by the example sales impact value generator circuitry 206 are $3500 for 4 meters and $4900 for 5 meters. The output sales-maximizing category-level planogram may indicate that a 5 meter category-level planogram produces the highest sales impact. In some examples, a maximum sales impact value or a sales-improving value associated with the sales-improving category-level planogram may be known as a second sales impact value. An example of the output of the space optimization model is shown in FIG. 3.

FIG. 3 is an illustration of example planograms to facilitate the example environment of FIG. 1. In the illustrated example of FIG. 3, the store 300 includes an example first sales-maximizing category-level planogram 302, an example second sales-maximizing category-level planogram 304, and an example third sales-maximizing category-level planogram 306. While only three planograms are shown, the store 300 can include any number of planograms having varying dimensions. The example first sales-maximizing category-level planogram 302 represents how the highest sales-generating planogram for chips is 4 meters. The example second sales-maximizing category-level planogram 304 represents how the highest sales-generating planogram for soda is 5 meters. The example third sales-maximizing category-level planogram 306 represents how the highest sales-generating planogram for bread is 3 meters. An example output of the example planogram generator circuitry 208 is shown in FIG. 3. In some examples, the output may be a human-readable label, a text value, or a sentence.

The output of the example planogram generator circuitry 208 shown in the illustrated example of FIG. 3 may cause a trigger response (e.g., by a market participant, by a robotic stocking system, etc.) to organize product in a store in a different manner to cause increased sales effects. In other words, the trigger response may be a spatial modification. For example, after viewing the output from the space optimization model, a retailer may desire to stock particular products in different areas in the store, promote particular products by different product placement in the store, or display particular products on certain shelves. In some examples, after the output from the space optimization model is generated, examples disclosed herein transmit and/or otherwise provide planogram output to robotic systems to facilitate shelf rearrangement tasks that will permit the realization of improved market effects. Accordingly, examples disclosed herein reduce a need for such computational efforts to identify sales-maximizing planograms and sales impact values for categories of products that were placed in a store and/or otherwise promoted based on a discretionary choice by the retailer or based on item-level product data, using a multitude of models to factor in various predictors.

In some examples, the data identifier circuitry 202 apparatus includes means for identifying data, the data transformer circuitry 204 includes a means for transforming data, the sales impact value generator circuitry 206 includes a means for generating a sales impact value, and the planogram generator circuitry 208 includes a means for generating planograms.

For example, the means for identifying data, transforming data, generating a sales impact value, and generating planograms may be implemented by example data identifier circuitry 202, example data transformer circuitry 204, example sales impact value generator circuitry 206, and example planogram generator circuitry 208, respectively. In some examples, the aforementioned circuitry may be instantiated by processor circuitry such as the example processor circuitry 512 of FIG. 5. For instance, the aforementioned circuitry may be instantiated by the example microprocessor 600 of FIG. 6 executing machine executable instructions such as those implemented by at least blocks 802, 804 of FIG. 8. In some examples, the aforementioned circuitry may be instantiated by hardware logic circuitry, which may be implemented by an ASIC, XPU, or the FPGA circuitry 700 of FIG. 7 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example space optimization circuitry 114 of FIG. 2 is illustrated in FIGS. 1 and 2, one or more of the elements, processes, and/or devices illustrated in FIGS. 1 and 2 may be combined, divided, re-arranged, omitted, eliminated, and/or implemented in any other way. Further, the example data identifier circuitry 202, the example data transformer circuitry 204, the example sales impact value generator circuitry 206, the example planogram generator circuitry 208, and/or, more generally, the example space optimization circuitry 114 of FIGS. 1 and 2, may be implemented by hardware alone or by hardware in combination with software and/or firmware. Thus, for example, any of the example data identifier circuitry 202, the example data transformer circuitry 204, the example sales impact value generator circuitry 206, the example planogram generator circuitry 208, and/or, more generally, the example space optimization circuitry 114 of FIGS. 1 and 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example space optimization circuitry 114 of FIGS. 1 and 2 may include one or more elements, processes, and/or devices in addition to, or instead of, those illustrated in FIG. 2, and/or may include more than one of any or all of the illustrated elements, processes and devices.

A flowchart representative of example machine readable instructions, which may be executed to configure processor circuitry to implement the space optimization circuitry 114 of FIGS. 1 and 2, is shown in FIG. 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example space optimization circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to improve space modeling. The machine readable instructions and/or the operations 400 of FIG. 4 begin at block 402, at which the example data identifier circuitry 202 identifies the main planogram length (MPL) for each category from user input or the example category-level planogram lengths database 104. The category-level planogram length represents a linear dimension of a planogram in a store corresponding to a category (e.g., chips, bread, soda, etc.) (block 402). The category-level planogram length identified first may be also known as the main planogram length for a category (block 402). In some examples, the example data identifier circuitry 202 identifies the main planogram length for each category in a manner consistent with example Equation 1 (block 402). At block 404, the example data identifier circuitry 202 determines if there are additional category-level planogram lengths for each category. If there are additional category-level planogram lengths for each category, the process proceeds to block 406. If there are no additional category-level planogram lengths for each category, the process proceeds to block 408.

At block 406, the example data identifier circuitry 202 identifies additional category-level planogram lengths for each category. In some examples, the example data identifier circuitry 202 identifies the satellite planogram lengths for each category in a manner consistent with example Equation 2 (block 406). The process proceeds to block 404 to determine if there are additional category-level planogram lengths for each category.

At block 408, the example data identifier circuitry 202 identifies a category-level predictor for each category from user input or the example category-level predictors database 106. A category-level predictor is a transactional parameter that represents a category (block 408). In other words, a category-level predictor represents a category and how a category may be affected transactionally or in terms of sales (block 408). Examples of category-level predictors include, but are not limited to, store productivity (e.g., volume per store selling meter), category price index, category promotion percentage (e.g., volume exposed to promotion), category out-of-stock percentage (e.g., volume exposed to out-of-stock), holiday variables (e.g., whether certain holidays have occurred in an observed week), weather variables (e.g., how weather affects volume), linear trend (e.g., over the next year), and complementary category variables (e.g., based on the previous year) (block 408). In some examples, the example data identifier circuitry 202 identifies the store productivity for each category in a manner consistent with example Equation 3 (block 408).

In some examples, the example data identifier circuitry 202 identifies the category price index for each category in a manner consistent with example Equation 4 (block 408). In some examples, the example data identifier circuitry 202 identifies the category promotion percentage for each category in a manner consistent with example Equation 5 (block 408). In some examples, the example data identifier circuitry 202 identifies the category OOS percentage for each category in a manner consistent with example Equation 6 (block 408). In some examples, the example data identifier circuitry 202 identifies the holiday indicator variables for each category in a manner consistent with example Rule 1 (block 408). The example data identifier circuitry 202 identifies the weather variables for each category (block 408). The weather variables help to explain changes in equivalized volume (block 408).

Examples of weather variables include, but are not limited to, precipitation and temperature (block 408). Precipitation and temperature are both generated using average values. $W_{cswi}$ represents the jth weather variable for a store, s, in week, w (block 408). In some examples, the weather for the next year will be same as the weather in the last year (block 408). In some examples, the example data identifier circuitry 202 identifies the complementary category variables for each category in a manner consistent with example Equation 7 (block 408). In some examples, the example data identifier circuitry 202 identifies the linear trend variables for each category in a manner consistent with example Equation 8 (block 408).

At block 410, the example data identifier circuitry 202 determines if there are additional category-level predictors for each category. If there are additional category-level predictors for each category, the process proceeds to block 412. If there are no additional category-level predictors for each category, the process proceeds to block 414.

At block 412, the example data identifier circuitry 202 identifies additional category-level predictors for each category. The process proceeds to block 410 to determine if there are additional category-level predictors for each category.

At block 414, the example data transformer circuitry 204 transforms the identified category-level data to standardized values that can be used effectively by the space efficiency model to generate the sales impact. The identified category-level data must be standardized to account for undesired variations of the identified category-level data (block 414). The example data transformer circuitry 204 transforms the identified category-level data, such as the category-level planogram lengths and category-level predictors, for each category (block 414). In some examples, the example data transformer circuitry 204 transforms the identified category-level data for each category in a manner consistent with example Equations 9-18 (block 414).

At block 416, the example sales impact value generator circuitry 206 aggregates the transformed category-level planogram lengths and category-level predictors for each category. More specifically, the example sales impact value generator circuitry 206 aggregates variables as demonstrated in a manner consistent with Equation 19 (block 416).

At block 418, the example sales impact value generator circuitry 206 generates a first sales impact value for each identified category-level planogram length for each category. A first sales impact value is a value that represents an amount of sales a category is generating for each associated category-level planogram length (block 418). A logit transformation is performed on the aggregation of the values of Equation 19 to generate the first sales impact value (block 418). Furthermore, $$EQV_{cs}^{max}$$

in Equation 19 is further defined in a manner consistent with example Equation 20 and example Rule 2 (block 418). Equation 19 is also known as the space efficiency model (block 418). As explained above, the first sales impact value generated from the space efficiency model will be used by the space optimization model to generate sales-maximizing category-level planograms (block 418).

At block 420, the example data identifier circuitry 202 identifies constraints. Constraints are rules that dictate, for example, the category-level planogram lengths, the fixtures of a store (e.g., freezers, shelves, etc.), and store growth opportunity (block 420). For example, consider three constraint levels as a planogram-level, a group-level, and a store-level (block 420). In some examples, there may be more than or less than three constraint levels that the example data identifier circuitry 202 may identify (block 420). In some examples, no constraints or more than one constraint per constraint level may be identified by the example data identifier circuitry 202 (block 420). The constraint levels may also be known as business rules (block 420).

At block 422, the example data identifier circuitry 202 identifies candidate category-level planograms of interest from a database of candidate category-level planograms for each category. A candidate category-level planogram of interest is a predefined category-level planogram that can be selected from a database (block 422). Picking a candidate category-level planogram of interest or multiple candidate category-level planograms of interest per category is helpful in determining which one produces the most sales impact for a category (block 422).

At block 424, the example data identifier circuitry 202 determines if there are additional category-level planograms of interest for each category. If there are additional category-level planograms of interest for each category, the process proceeds to block 426. If there are no additional category-level planograms of interest for each category, the process proceeds to block 428.

At block 426, the example data identifier circuitry 202 identifies additional category-level planograms of interest for each category. The process proceeds to block 424 to determine if there are additional category-level planograms of interest for each category.

At block 428, the example planogram generator circuitry 208 generates a sales-maximizing category-level planogram for each category using the space optimization model. The sales-maximizing category-level planograms are generated by taking into account the identified constraints, identified candidate category-level planograms of interest, and first sales impact values from the space efficiency model for each category (block 428). In some examples, the sales-maximizing category-level planogram may be known as the second candidate category-level planogram (block 428). In some examples, the planogram generator circuitry 208 generates the sales-maximizing category-level planogram for each category in a manner consistent with example Equation 21 (block 428).

Figure 5:
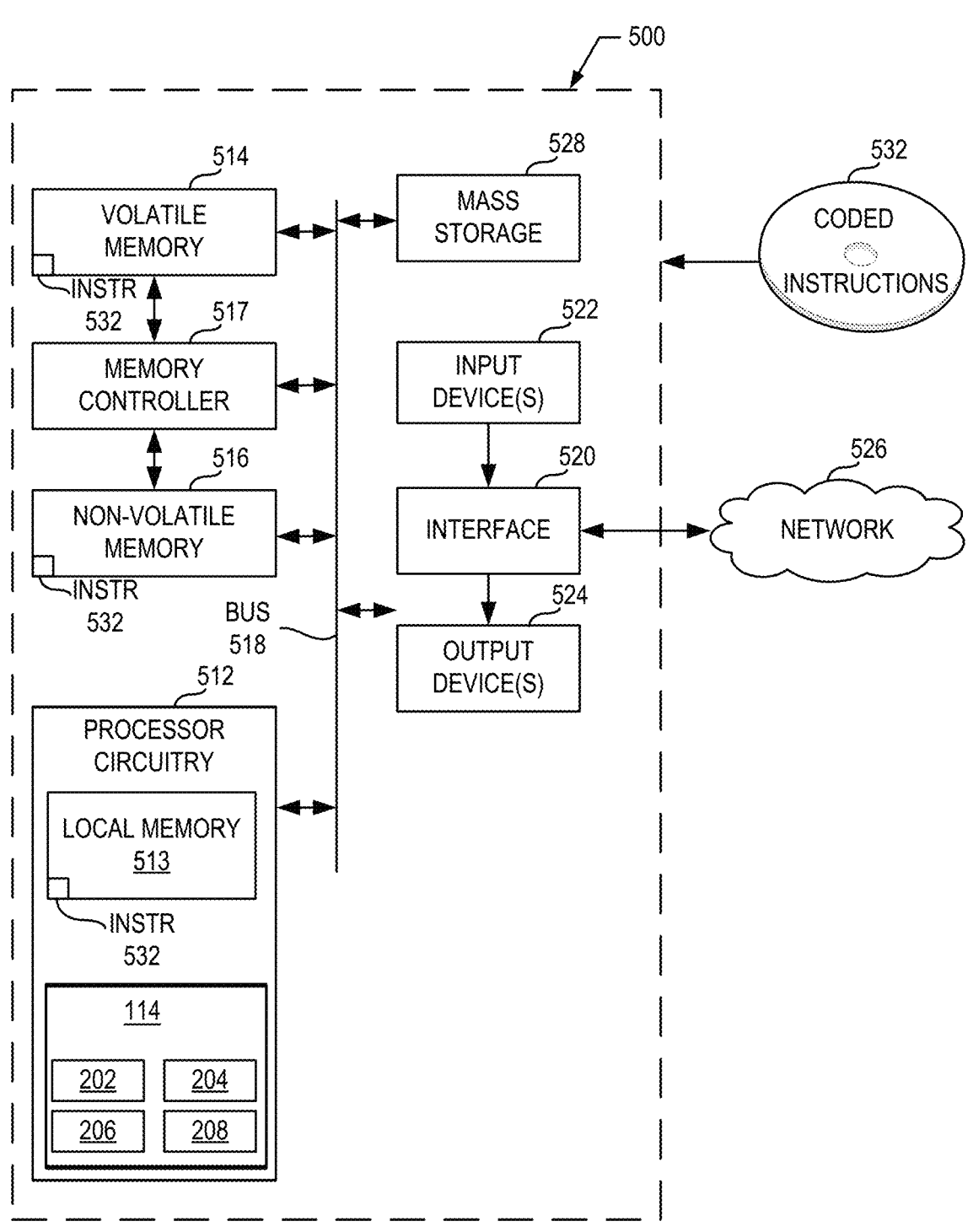
FIG. 5 is a block diagram of an example processing platform including processor circuitry structured to execute the example machine readable instructions and/or the example operations of FIG. 4 to implement the example space optimization circuitry of FIGS. 1 and 2.

FIG. 5 is a block diagram of an example processor platform 400 structured to execute and/or instantiate the machine readable instructions and/or the operations of FIG. 4 to implement the example space optimization circuitry 114 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example data identifier circuitry 202, example data transformer circuitry 204, example sales impact value generator circuitry 206, example planogram generator circuitry 208, and example space optimization circuitry 114 as illustrated in FIGS. 1 and 2.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIG. 4, may be stored in the mass storage device 528, in the volatile memory 514, in the non-volatile memory 516, and/or on a removable non-transitory computer readable storage medium such as a CD or DVD.

Figure 6:
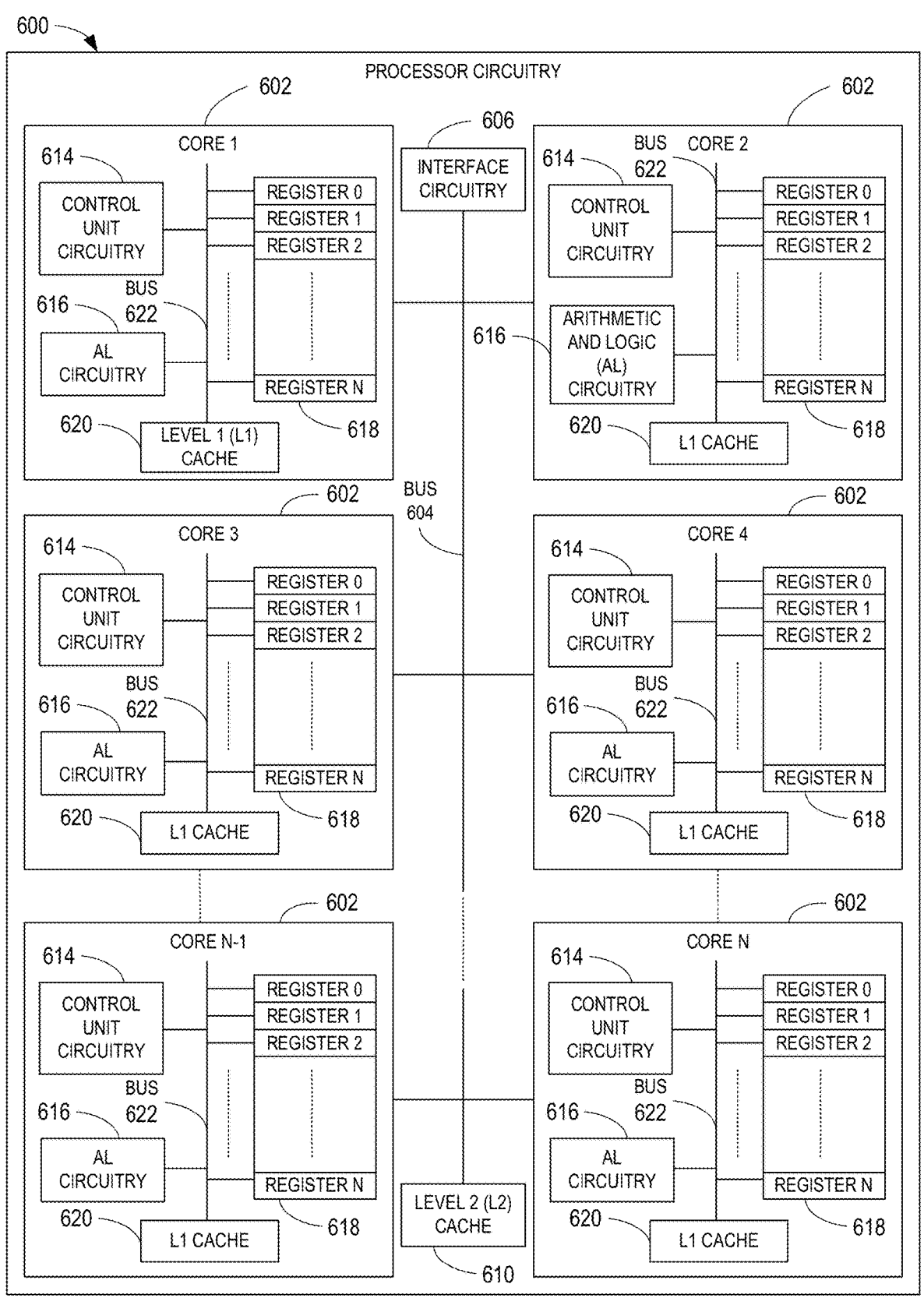
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowchart of FIG. 4 to effectively instantiate the circuitry of FIG. 2 as logic circuits to perform the operations corresponding to those machine readable instructions. In some such examples, the circuitry of FIG. 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semi-conductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
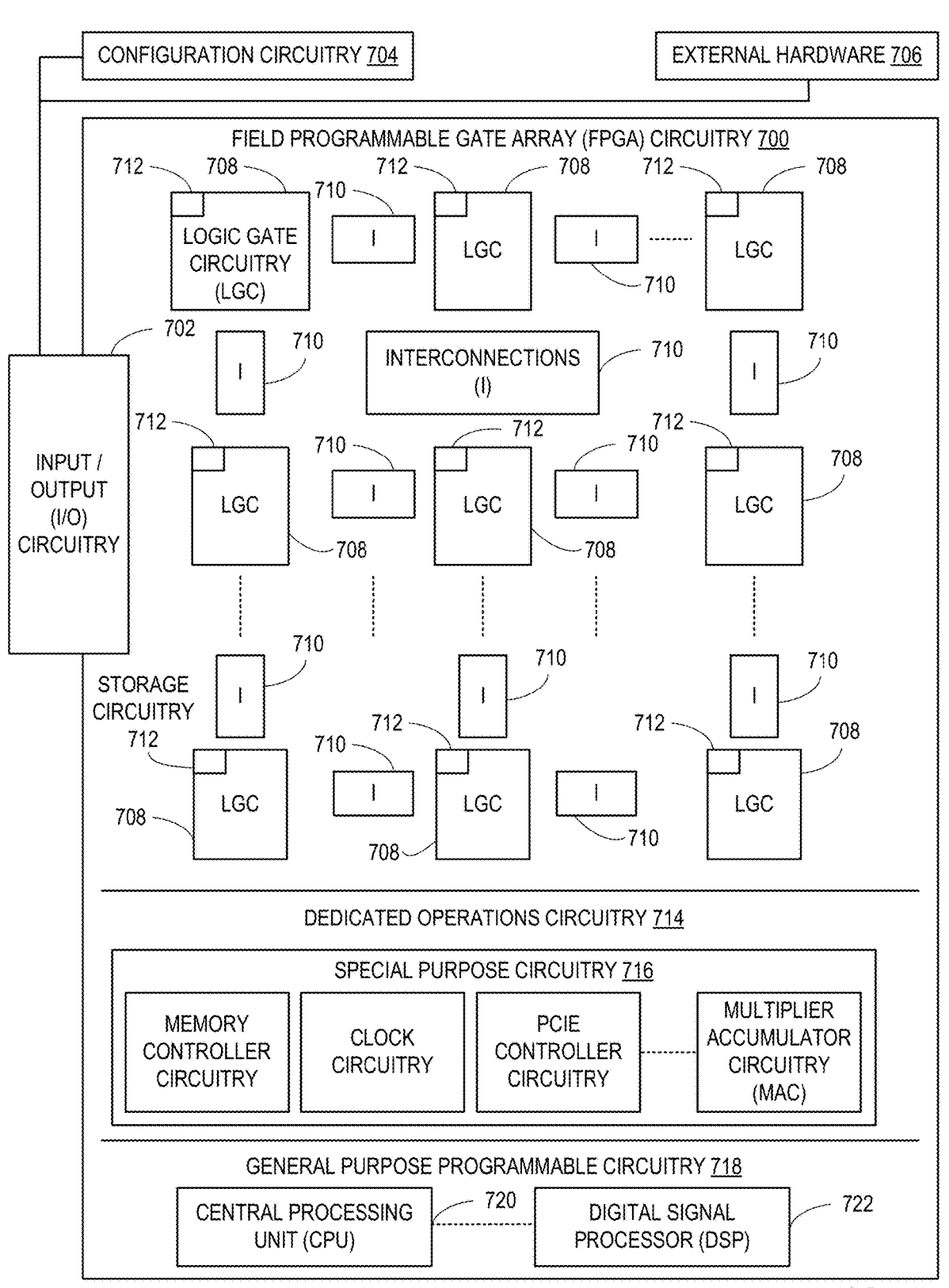
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowchart of FIG. 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 700 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIG. 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 4 may be executed by one or more of the cores 602 of FIG. 6, a second portion of the machine readable instructions represented by the flowchart of FIG. 4 may be executed by the FPGA circuitry 700 of FIG. 7, and/or a third portion of the machine readable instructions represented by the flowchart of FIG. 4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
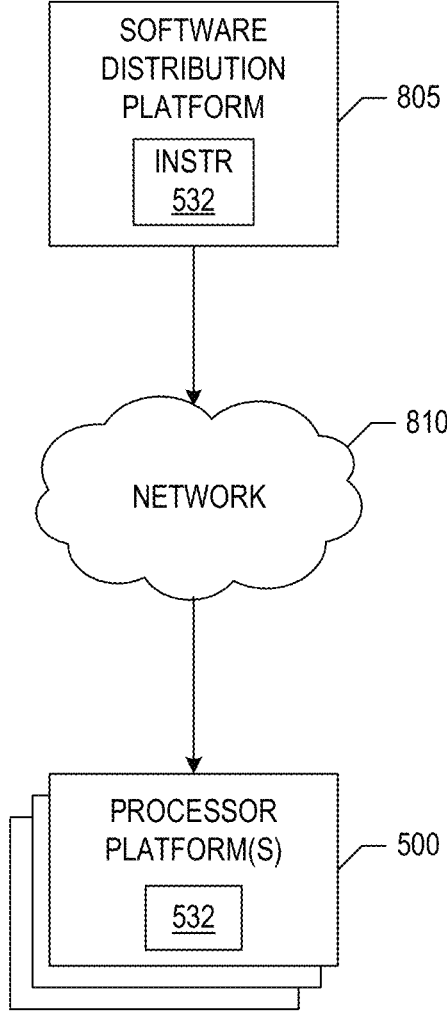
FIG. 8 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sublicensing. In the illustrated example, the software distribution platform 805 includes one or more servers and one or more storage devices. The storage devices store the machine readable instructions 532, which may correspond to the example machine readable instructions of FIG. 4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions of FIG. 4, may be downloaded to the example processor platform 500, which is to execute the machine readable instructions 532 to implement the example space optimization circuitry 114. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that improve space modeling. Disclosed systems, methods, apparatus, and articles of manufacture improve the efficiency of using a computing device by eliminating market participants' reliance on item-level product data to decide, for instance, where to place a product, which products to remove from shelves, and/or which products to place on shelves to improve (e.g., maximize) the sales impact. Additionally, examples disclosed herein improve the technological field of market analysis that is ordinarily burdened with inefficient use of computational resources. In some examples, general computational resources that employ traditional techniques to improve space modeling consume wasted computational cycles during troubleshooting and/or re-calculation efforts. However, examples disclosed herein specifically tailor and/or otherwise structure general computational resources to exhibit specialized capabilities that reduce otherwise computationally expensive processes to troubleshoot which prior product placement and/or promotional decisions were unsuccessful. Furthermore, there are thousands of products at a single retail store and the human mind is incapable to process, in a reasonable amount of time, the sales impact of a product based on item-level product data. Accordingly, examples disclosed herein reduce a need for computational efforts to identify sales-maximizing planograms and sales impact values for categories of products that were subjected to mere discretionary choices (e.g., placed in a store and/or otherwise promoted based on a discretionary choice by the retailer or based on item-level product data). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve space modeling are disclosed herein. Further examples and combinations thereof include the following:

Example 1 includes an apparatus to improve space modeling comprising interface circuitry, machine readable instructions, and programmable circuitry to at least one of instantiate or execute the machine readable instructions to identify a category-level planogram length and category-level predictors for a category, apply a first model to transform the category-level planogram length and the category-level predictors for the category to a first-model-compatible category-level planogram length and first-model-compatible category-level predictors, generate a first sales impact value corresponding to the identified category-level planogram length for the category by using the first-model-compatible category-level planogram length and the first-model-compatible category-level predictors, generate a modified category-level planogram corresponding to a second sales impact value for the category, the modified category-level planogram generated by applying a second model to (a) the first sales impact value, (b) at least one constraint, and (c) a candidate category-level planogram of interest, and cause a spatial modification of products corresponding to the category based on the modified category-level planogram.

Example 2 includes the apparatus of example 1, wherein the category-level predictors include at least one of a store productivity, a category price index, a category promotion percentage, or a category out-of-stock percentage.

Example 3 includes the apparatus of example 1, wherein the at least one constraint includes at least one of a planogram-level constraint, a group-level constraint, or a store-level constraint.

Example 4 includes the apparatus of example 1, wherein the spatial modification represents a response to organize the category in a store in a different manner to cause increased sales effects.

Example 5 includes the apparatus of example 1, wherein the second sales impact value for the category represents a sales-improving value.

Example 6 includes the apparatus of example 1, wherein the candidate category-level planogram of interest represents a predefined category-level planogram that is selected from a database.

Example 7 includes the apparatus of example 1, wherein the first sales impact value corresponding to the identified category-level planogram length for the category is a logit transformation of the first-model-compatible category-level planogram length and the first-model-compatible category-level predictors.

Example 8 includes the apparatus of example 7, wherein the first-model-compatible category-level planogram length and the first-model-compatible category-level predictors for the category are aggregated prior to the logit transformation of the first-model-compatible category-level planogram length and the first-model-compatible category-level predictors to generate the first sales impact value.

Example 9 includes an apparatus to improve space modeling, comprising data identifier circuitry to identify a category-level planogram length and category-level predictors for a category, data transformer circuitry to apply a first model to transform the category-level planogram length and the category-level predictors for the category to a first-model-compatible category-level planogram length and first-model-compatible category-level predictors, sales impact value generator circuitry to generate a first sales impact value corresponding to the identified category-level planogram length for the category by using the first-model-compatible category-level planogram length and the first-model-compatible category-level predictors, and planogram generator circuitry to generate a modified category-level planogram corresponding to a second sales impact value for the category, the modified category-level planogram generated by applying a second model to (a) the first sales impact value, (b) at least one constraint, and (c) a candidate category-level planogram of interest, and cause a spatial modification of products corresponding to the category based on the modified category-level planogram.

Example 10 includes the apparatus of example 9, wherein the category-level predictors include at least one of a store productivity, a category price index, a category promotion percentage, or a category out-of-stock percentage.

Example 11 includes the apparatus of example 9, wherein the at least one constraint includes at least one of a planogram-level constraint, a group-level constraint, or a store-level constraint.

Example 12 includes the apparatus of example 9, wherein the spatial modification represents a response to organize the category in a store in a different manner to cause increased sales effects.

Example 13 includes the apparatus of example 9, wherein the second sales impact value for the category represents a sales-improving value.

Example 14 includes the apparatus of example 9, wherein the candidate category-level planogram of interest represents a predefined category-level planogram that is selected from a database.

Example 15 includes the apparatus of example 9, wherein the sales impact value generator circuitry is to generate the first sales impact value corresponding to the identified category-level planogram length for the category by applying a logit transformation of the first-model-compatible category-level planogram length and the first-model-compatible category-level predictors.

Example 16 includes the apparatus of example 15, wherein the first-model-compatible category-level planogram length and the first-model-compatible category-level predictors for the category are aggregated prior to the logit transformation of the first-model-compatible category-level planogram length and the first-model-compatible category-level predictors to generate the first sales impact value.

Example 17 includes a non-transitory machine readable storage medium comprising instructions to cause programmable circuitry to at least identify a category-level planogram length and category-level predictors for a category, apply a first model to transform the category-level planogram length and the category-level predictors for the category to a first-model-compatible category-level planogram length and first-model-compatible category-level predictors, generate a first sales impact value corresponding to the identified category-level planogram length for the category by using the first-model-compatible category-level planogram length and the first-model-compatible category-level predictors, generate a modified category-level planogram corresponding to a second sales impact value for the category, the modified category-level planogram generated by applying a second model to (a) the first sales impact value, (b) at least one constraint, and (c) a candidate category-level planogram of interest, and cause a spatial modification of products corresponding to the category based on the modified category-level planogram.

Example 18 includes the non-transitory machine readable storage medium of example 17, wherein the category-level predictors include at least one of a store productivity, a category price index, a category promotion percentage, or a category out-of-stock percentage.

Example 19 includes the non-transitory machine readable storage medium of example 17, wherein the at least one constraint includes at least one of a planogram-level constraint, a group-level constraint, or a store-level constraint.

Example 20 includes the non-transitory machine readable storage medium of example 17, wherein the spatial modification represents a response to organize the category in a store in a different manner to cause increased sales effects.

Example 21 includes the non-transitory machine readable storage medium of example 17, wherein the second sales impact value for the category represents a sales-improving value.

Example 22 includes the non-transitory machine readable storage medium of example 17, wherein the candidate category-level planogram of interest represents a predefined category-level planogram that is selected from a database.

Example 23 includes the non-transitory machine readable storage medium of example 17, wherein the first sales impact value corresponding to the identified category-level planogram length for the category is a logit transformation of the first-model-compatible category-level planogram length and the first-model-compatible category-level predictors.

Example 24 includes the non-transitory machine readable storage medium of example 23, wherein the first-model-compatible category-level planogram length and the first-model-compatible category-level predictors for the category are aggregated prior to the logit transformation of the first-model-compatible category-level planogram length and the first-model-compatible category-level predictors to generate the first sales impact value.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
interface circuitry;
machine readable instructions; and
at least one processor circuit to be programmed by the machine readable instructions to:
identify a category-level planogram length and category-level predictors for a category, the category-level planogram length based on (a) facings count values and (b) width values of products associated with the category, and the category-level predictors associated with transactional metrics of the category;

generate predictor coefficients by executing a first model;
transform, based on the predictor coefficients of the first model, the category-level planogram length and the category-level predictors for the category to a first-model-compatible category-level planogram length and first-model-compatible category-level predictors, the transformation to reduce variations between the category-level predictors and the transactional metrics of the category;
generate a first impact value corresponding to the identified category-level planogram length for the category based on a logit transformation of the first-model-compatible category-level planogram length and the first-model-compatible category-level predictors;
execute a second model to generate a modified category-level planogram corresponding to a second impact value for the category, the modified category-level planogram based on (a) the first impact value, (b) at least one constraint, and (c) a candidate category-level planogram of interest; and
cause a robotic stocking system to alter an arrangement of the products corresponding to the category based on a ranked performance metric of the modified category-level planogram generated by the second model.

2. The apparatus of claim 1, wherein the category-level predictors include at least one of a store productivity, a category index, a category promotion percentage, or a category out-of-stock percentage.

3. The apparatus of claim 1, wherein the at least one constraint includes at least one of a planogram-level constraint, a group-level constraint, or a store-level constraint.

4. The apparatus of claim 1, wherein one or more of the at least one processor circuit is to cause the robotic stocking system to alter the arrangement of the products to cause increased sales.

5. The apparatus of claim 1, wherein the second impact value for the category represents a sales-improving value.

6. The apparatus of claim 1, wherein the candidate category-level planogram of interest represents a predefined category-level planogram that is selected from a database.

7. The apparatus of claim 1, wherein the first-model-compatible category-level planogram length and the first-model-compatible category-level predictors for the category are aggregated prior to the logit transformation of the first-model-compatible category-level planogram length and the first-model-compatible category-level predictors to generate the first impact value.

8. An apparatus comprising:
data identifier circuitry to:
identify a category-level planogram length and category-level predictors for a category, the category-level planogram length based on (a) facings count values and (b) width values of products associated with the category, and the category-level predictors associated with transactional metrics of the category; and
generate predictor coefficients by executing a first model;
data transformer circuitry to transform, based on the predictor coefficients of the first model, the category-level planogram length and the category-level predictors for the category to a first-model-compatible category-level planogram length and first-model-compatible category-level predictors, the transformation to reduce variations between the category-level predictors and the transactional metrics of the category;

sales impact value generator circuitry to generate a first impact value corresponding to the identified category-level planogram length for the category based on a logit transformation of the first-model-compatible category-level planogram length and the first-model-compatible category-level predictors; and planogram generator circuitry to:

execute a second model to generate a modified category-level planogram corresponding to a second impact value for the category, the modified category-level planogram based on (a) the first impact value, (b) at least one constraint, and (c) a candidate category-level planogram of interest; and cause a robotic stocking system to alter a spatial arrangement of the products corresponding to the category based on a ranked performance metric of the modified category-level planogram generated by the second model.

9. The apparatus of claim 8, wherein the category-level predictors include at least one of a store productivity, a category index, a category promotion percentage, or a category out-of-stock percentage.

10. The apparatus of claim 8, wherein the at least one constraint includes at least one of a planogram-level constraint, a group-level constraint, or a store-level constraint.

11. The apparatus of claim 8, wherein the planogram generator circuitry is to cause the robotic stocking system to alter the spatial arrangement of the products to cause increased sales.

12. The apparatus of claim 8, wherein the second impact value for the category represents a sales-improving value.

13. The apparatus of claim 8, wherein the candidate category-level planogram of interest represents a predefined category-level planogram that is selected from a database.

14. The apparatus of claim 8, wherein the first-model-compatible category-level planogram length and the first-model-compatible category-level predictors for the category are aggregated prior to the logit transformation of the first-model-compatible category-level planogram length and the first-model-compatible category-level predictors to generate the first impact value.

15. At least one non-transitory machine readable medium comprising machine readable instructions to cause at least one processor circuit to at least:

identify a category-level planogram length and category-level predictors for a category, the category-level planogram length based on (a) facings count values and (b) width values of products associated with the category, and the category-level predictors associated with transactional metrics of the category;

generate predictor coefficients by executing a first model;

transform, based on the predictor coefficients of the first model, the category-level planogram length and the category-level predictors for the category to a first-model-compatible category-level planogram length and first-model-compatible category-level predictors, the transformation to reduce variations between the category-level predictors and the transactional metrics of the category;

generate a first impact value corresponding to the identified category-level planogram length for the category based on a logit transformation of the first-model-compatible category-level planogram length and the first-model-compatible category-level predictors;

execute a second model to generate a modified category-level planogram corresponding to a second impact value for the category, the modified category-level planogram based on (a) the first impact value, (b) at least one constraint, and (c) a candidate category-level planogram of interest; and cause a robotic stocking system to alter an arrangement of the products corresponding to the category based on a ranked performance metric of the modified category-level planogram generated by the second model.

16. The at least one non-transitory machine readable medium of claim 15, wherein the category-level predictors include at least one of a store productivity, a category index, a category promotion percentage, or a category out-of-stock percentage.

17. The at least one non-transitory machine readable medium of claim 15, wherein the at least one constraint includes at least one of a planogram-level constraint, a group-level constraint, or a store-level constraint.

18. The at least one non-transitory machine readable medium of claim 15, wherein the arrangement of the products in a store is altered to cause increased sales.

* * * * *